United States Patent [19]

Borst et al.

[11] 4,207,846
[45] Jun. 17, 1980

[54] SIMPLIFIED COMPUTER IGNITION CONTROL SYSTEM

[75] Inventors: Wolfgang Borst, Schwieberdingen; Winfried Klotzner, Maulbronn; Ernst-Olav Pagel, Bohmfeld; Hermann Vetter, Hessigheim, all of Fed. Rep. of Germany

[73] Assignee: Robert Bosch GmbH, Stuttgart, Fed. Rep. of Germany

[21] Appl. No.: 894,335

[22] Filed: Apr. 7, 1978

[30] Foreign Application Priority Data

May 26, 1977 [DE] Fed. Rep. of Germany ....... 2723801

[51] Int. Cl.² ............................................... F02P 5/04
[52] U.S. Cl. .......................... 123/117 D; 123/148 ND
[58] Field of Search ..... 123/148 E, 148 ND, 148 CB, 123/117 D, 117 R

[56] References Cited

U.S. PATENT DOCUMENTS

| | | | |
|---|---|---|---|
| 3,621,826 | 11/1971 | Chrestensen | 123/148 E |
| 3,935,844 | 2/1976 | Nishimiya | 123/148 DS |
| 3,955,723 | 5/1976 | Richards | 123/148 E |
| 4,104,997 | 8/1978 | Padgitt | 123/148 E |

Primary Examiner—Ronald B. Cox
Attorney, Agent, or Firm—Frishauf, Holtz, Goodman & Woodward

[57] ABSTRACT

To control the ignition timing in a multicylinder engine, the computer output signal which controls the current flow through the ignition coil for generating the spark in the first cylinder is delayed and then applied to the ignition coil controlling the spark in a subsequent cylinder. The computer output signal is delayed by passing through a shift register whose clock input is derived from a pulse generator generating a pulse for each predetermined incremental angular rotation of the crankshaft. If a single ignition coil and a distributor are used, the computer output signal and the delayed computer output signal are applied to an OR gate whose output controls a switch controlling the current through the ignition coil. When more than one ignition coil is used, the computer output signal is applied to a switch controlling the current through the first coil, the delayed computer output signal to a switch controlling the current to a second coil. Further delays may be furnished for a control of sparking in additional cylinders.

11 Claims, 3 Drawing Figures

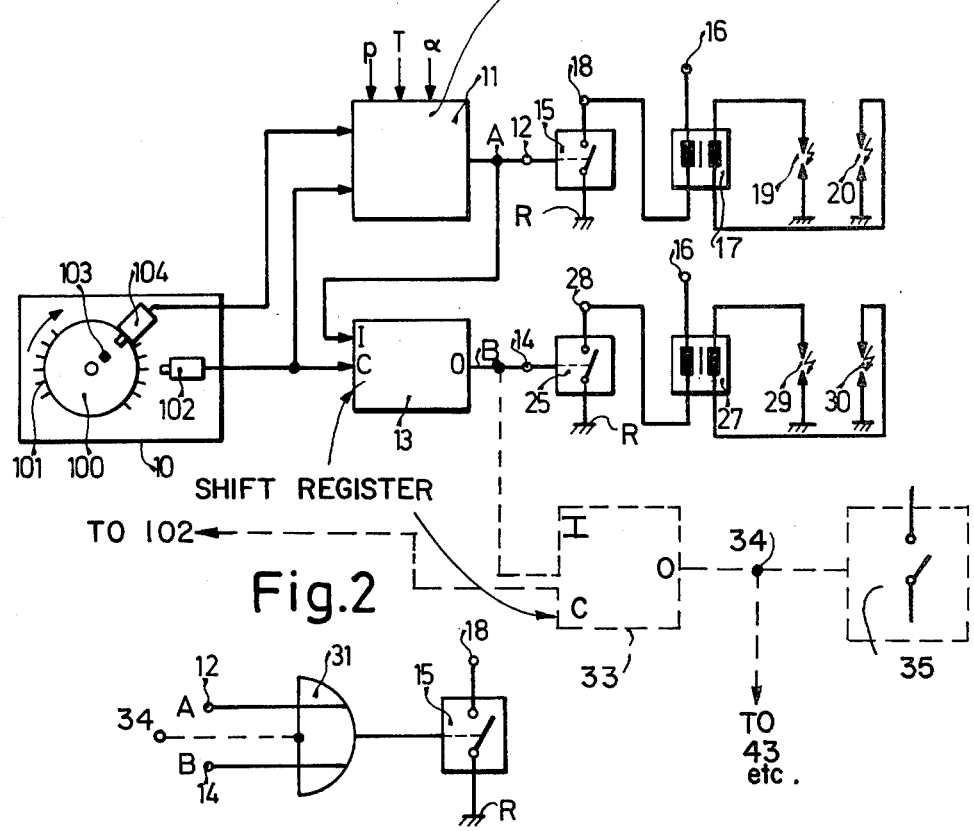
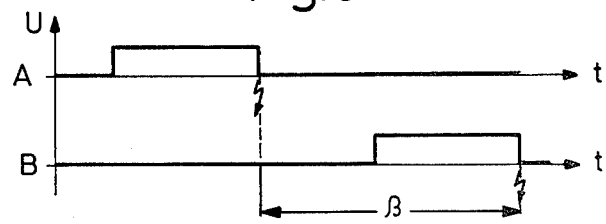

SIMPLIFIED COMPUTER IGNITION CONTROL SYSTEM

The present invention relates to ignition systems and particularly to ignition systems for multicylinder internal combustion engines, where, sparks have to be generated which are temporally shifted relative to each other by a predetermined angles of rotation of, the crankshaft of the engine.

BACKGROUND AND PRIOR ART

In German Pat. No. 1,258,189 and German DT-OS No. 2,249,838, ignition systems for internal combustion engines with a plurality of cylinders are disclosed. However, in these systems, the spark generating signals which are shifted by predetermined angles relative to each other are generated by a plurality of individual electronic ignition systems, one for each ignition coil. The shifting of the spark generating signal is controlled by the position signal furnishing means, that is by a sensing system which senses markings or other indicators placed at predetermined angular intervals around the circumference of a rotating shaft in the engine. The ignition systems are energized in a predetermined order in accordance with the so-furnished position signals. This requires a very great amount of equipment in particular for complicated ignition systems which include computing stages for determining the time for which a switch controlling the current through an ignition coil is closed, as well as the angle at which the switch is to be opened. In another system, disclosed in U.S. Pat. No. 3,943,898, a reference marking on the position signal generating means is electronically multiplied and the so-multiplied signal applied to an ignition computer. The position signal furnishing means are therefore particularly simple but the ignition computer is relatively expensive.

THE INVENTION

It is an object to provide an ignition control system utilizing only a simple ignition computer as required for a minimal number of cylinders and a very simple position furnishing means, for example with only one reference mark.

Briefly, a delay means, for example a shift register, is connected to the output of the computing stage. The delay means delay the computer output signal for a period of time corresponding to the angle of rotation determined by the number of cylinders. The delayed computer output signal controls the switch which allows and blocks current flow through the ignition coil. In one preferred embodiment, a single ignition coil and a distributor are utilized, the computer output signal and the delayed output signal being applied to control the switch through an OR gate. This embodiment may require a distributor and more circuitry, but only one coil. In a second preferred embodiment utilizing a plurality of ignition coils, the computer output signal and the delayed computer output signal each control a switch associated with a corresponding one of the ignition coils. This embodiment, at the cost of an additional coil, or coils, simplifies the circuit and can eliminate a high voltage distributor.

DRAWING ILLUSTRATING THE PREFERRED EMBODIMENTS

FIG. 1 is a simplified diagram of a first embodiment of the present invention utilizing a plurality of ignition coils;

FIG. 2 is a schematic diagram of the additional circuitry required for an embodiment utilizing only one ignition coil; and FIG. 3 shows signal levels as a function of time in the embodiments of FIGS. 1 and 2.

A position signal furnishing means 10 (FIG. 1) comprises a toothed disk 100 which is connected to the crankshaft of an internal combustion engine. Disk 100 has a plurality of ferromagnetic teeth 101. These teeth are sensed by first sensor 102 which is an inductive member whose inductivity changes as each ferromagnetic tooth passes. The change in inductivity causes a signal to be generated. Of course other marks could be used instead of the ferromagnetic teeth. A disk having holes which allow light to pass through which is in turn evaluated by an optical sensor, a disk which is magnetized in strips along its circumference, etc. would be suitable. Disk 100 also has a reference mark 103. Again, the reference mark 103 could be placed on another disk or even one mounted on another rotating member of the engine. The reference mark 103 is scanned by a second sensor 104. Pulse forming stages (not shown) are provided to shape the signals sensed by sensors 103 and 104 into rectangular signals.

Sensors 102 and 104 are connected to the inputs of an ignition time computing stage 11. The output of computing stage 11 is a pulse which determines the amount of time that current flows through the ignition coil and the time at which the ignition occurs. This pulse is generated in dependence on the position signals furnished by unit 10 and on various parameters of the engine such as the temperature, the throttle position, the pressure of the exhaust etc. The computing stage implements ignition angle characteristic curves. Such computing stages are well known and are shown for example in U.S. Pat. Nos. 4,063,539 or 3,943,898.

The output of computing stage 11 is connected to a terminal 12 and to the input of a shift register 13. Shift register 13 operates as a series-in, series-out shift register. The output of shift register 13 is connected to a terminal 14. The clock input of shift register 13 is connected to the first sensor 102.

Terminal 12 is also connected to the control input of an electronic switch 15. Electronic switch 15, in a preferred embodiment, is a semiconductor switch such as a transistor or thyristor. The positive terminal of a supply voltage source 16 is connected to a series circuit including the primary winding of an ignition coil 17 and the output (emitter-collector) circuit of transistor 15. A terminal 18 is provided at the common point of ignition coil 17 and transistor 15. The secondary winding of ignition coil 17 has one terminal connected to the primary winding and a second terminal connected to a reference potential R (chassis or ground) through two spark circuits 19, 20 connected in parallel. Terminal 14 is connected to a similar system, the reference numerals of this system being increased by 10 relative to the reference numerals of the above described system. Terminal 16 is of course the same.

The system shown in FIG. 1 is used for controlling a four cylinder engine. Sparks are generated in two spark plugs at the same time. This does not cause any difficulty since an ignitable mixture is present in only one of the cylinders each time a high voltage is induced in the secondary winding of ignition coil 17. The other cylinder is in the exhaust phase. If each ignition coil is to control a larger number of spark plugs, a high voltage distributor must be provided.

If only a single ignition coil 17 is to be used, OR gate 31 shown in FIG. 2 is required. A first input of OR gate 31 is connected to terminal 12 and a second input to terminal 14. The output of OR gate 31 controls switch 15. A current then flows through ignition coil 17 in response to both the computer output signal appearing at terminal 12 and the delayed computer output signal appearing at terminal 14. A high voltage distributor applies this voltage alternately to spark plugs 19, 20 and 29, 30.

Operation

The signal appearing at terminal A of FIGS. 1 and 2 is shown in line A of FIG. 3. As is known from the referenced prior art, the control signal shown in line A has a pulse width which determines the closing time of switch 15. During this time, magnetic energy is stored in ignition coil 17. When pulse A is terminated, switch 15 opens and a high voltage pulse is induced in the secondary winding of ignition coil 17. This causes a spark to be generated at spark plug 19 and 20. Signal A is also applied to the signal input of shift register 14. The clock input of shift register 13 is connected to sensor 102. Signal A is thus shifted through shift register 13 by the position signals at the output of sensor 102. The signal B thus appears at the output of shift register 14 delayed by a number of clock pulses determined by the number of stages of shift register 13. Pulse B, that is the pulse at terminal 14 is delayed by an angle of rotation B relative to pulse A. Pulse B controls the current flowing through ignition coil 27.

Operation, eight cylinder engine, wheel 100 has 360 teeth 102. A position signal, namely a pulse furnished by unit 101 thus corresponds to 1° of rotation of the crankshaft. Pulse A shown in FIG. 3 results at the output of stage 11. Shift register 13 has ninety stages so that after ninety teeth, corresponding to ninety clock signals, corresponding to 90° of crankshaft rotation, signal B starts to appear at the output of shift register 13. A second delay unit (not shown) has its signal input connected to terminal 14 and a clock input connected to sensor 102. The output of this delay unit, which again is a ninety stage shift register, furnishes a signal 90° following signal B. A further additional ninety stage shift register receives the output from the above mentioned shift register as input and also has a clock input connected to sensor 102. The output of the third delay stage thus appears 180° after the B signal. Each delay unit controls a switch corresponding to switches 15 and 25, each of the switches being connected in series with an ignition coil. Each ignition coil in turn controls two spark plugs. Thus an ignition system for an eight cylinder internal combustion engine is provided which operates without mechanically moving high voltage distributor contacts and which requires only one computing stage. The computing stage is particularly simple and is the same as that which would be utilized for a two cylinder internal combustion engine.

The system for the present invention can also be used with asymmetrical engines. Cylinders which are symmetrical to the top dead center position of the first cylinder are ignited by signal A, while the asymmetrical ones are ignited by signal B. The corresponding angle can easily be adjusted by the number of stages in shift register 13. The signals A and B can also be applied to an OR gate 31 as shown in FIG. 2 and alternately control a single ignition coil. Under these conditions, of course, a mechanically operating high voltage distributor would have to be used. A plurality of delay means 33, 43 . . . can be cascaded, the output of the first delay means (13) being connected to further delay means 33, and so on. The further delay means 33 will provide a delayed timing signal for application to a further switch 35 which can be connected to a further ignition coil (not shown) similar to coil 27, for application to additional spark plugs, so that the delayed timing output signals will continue to be delayed by time periods corresponding to the predetermined angle of rotation; or, alternatively, the output available at terminal 34 from shift register 33 can be connected to OR gate 31, in dependence upon whether the embodiment utilizes one coil and a distributor or a plurality of coils for individual cylinder pair is selected.

Various changes and modifications may be made within the scope of the inventive concept.

We claim:

1. In an ignition system for an internal combustion engine having a rotating member; position signal furnishing means for furnishing a sequence of position signals each indicative of the angular position of said rotating member relative to a reference position, ignition control means for furnishing a spark generating signal in response to a change in current flowing therethrough, first spark generating means connected to said ignition control means for creating a spark in response to said spark generating signal, and timing control means interconnected between said position signal furnishing means and said ignition control means connected to and controlled by at least one operating parameter of the engine and by the reference signal for furnishing a timing output signal controlling the timing of current in flow in said igniont control means at least in part in dependence on said at least on operating parameter and on said position signals relative to said reference position:

apparatus for furnishing sequential spark generating signals to said generating means (29,30) comprising, in accordance with the invention, delay means interconnected between said timing control means, said position signal furnishing means, and said ignition control means, for delaying said timing output signal for a time period corresponding to a predetermined angle of rotation of said rotating member, thereby furnishing a delayed timing output signal, said delayed timing output signal causing the generation of a delayed spark generating signal by said ignition control means;

Said timing control means computing one timing output signal for all spark generating means during one revolution of the rotating means and said delay means temp )rally allocating said so computed timing output signal to the respective spark generating means.

2. A system as set forth in claim 1, wherein said delay means comprises a shift register (13) having a clock input connected to said position signal furnishing means (102).

3. A system as set forth in claim 1, wherein said ignition control means comprises a first ignition coil (17) connected to the output of said timing control means (13), and a second ignition coil (27) connected to the output of said delay means.

4. A system as set forth in claim 1, wherein said ignition control means comprises on ignition coil (17); further comprising logic circuit means (31) interconnected between said timing control means (11), said delay means (13) and said ignition coil, (17) for changing the current through said ignition coil in response to said timing output signal or said delayed timing output signal.

5. A system as set forth in claim 3, wherein said logic circuit means comprises an OR gate (31).

6. A system as set forth in claim 5, wherein said delay means (13) comprises first delay means connected to said timing means for furnishing a first delayed timing output signal in response to said timing output signal, and second delay means connected to said first delay means for furnishing a second delayed timing output signal delayed by a time period corresponding to a predetermined angle of rotation of said rotating member relative to said first delayed timing output signal; and
wherein said logic circuit means (31) comprises means for controlling the current through said ignition control means in response to said timing output signal, said first delayed timing output signal or said second delayed timing output signal.

7. Multicylinder internal combustion engine ignition system utilizing an ignition coil means (17, 27 . . . ) having
crankshaft position signal generating means (10) generating a signal train representative of rotation of the crankshaft of the engine;
ignition signal generating means (11) generating ignition control signals controlling current flow through the ignition coil means of the ignition system in dependence on at least one operating parameter of the engine and generating one timing output signal for all spark plugs associated with respective cylinders of the multicylinder engine during one revolution of the crankshaft;
and means temporally allocating said parameter dependent ignition control signal to control spark discharge of spark plugs of multicylinder engine comprising in accordance with the invention
first means (12) connecting said parameter dependent ignition signal generating means to the ignition coil means to generate a spark in a spark plug associated with a predetermined cylinder;
time delay means (13) connected to said parameter dependent ignition signal generating means to provide a derived time delayed ignition signal, the delay time of which is determined by the time lapse between occurrence of sparks at spark plugs associated with different cylinders;
and second connection means (14, 31) connecting the output of said time delay means to the ignition coil means.

8. System according to claim 7 wherein the ignition coil means comprises a plurality of ignition coils (17, 27 . . . ) connected to respective spark plugs associated with respective cylinders of the multicylinder engine, one of said ignition coils being connected to said first connection means, and another ignition coil being connected to said second connection means (14), the time of occurrence of said current flow as controlled by the ignition signal generating means (11) being time shifted by said time delay means with respect to the current flow in the first ignition coil (17) by said delay time.

9. System according to claim 7 wherein the ignition coil means comprises a single ignition coil;
and said first and second connection means comprise a logic OR circuit having its input connected to both the output of the ignition generating means to control generation of and determine the timing of a first spark and the output of the time delay means to control generation of and determine the timing of a subsequent spark or sparks.

10. System according to claim 8 wherein the time delay means (13) comprises a shift register connected to the crankshaft position signal generating means and shifting the time of occurrence of said ignition control signal as determined by said ignition generating means by the time required for the crankshaft of the engine to rotate through an angle of revolution which will place a piston in the cylinder with which another spark plug is associated in the compression stroke position.

11. System according to claim 9 wherein the time delay means (13) comprises a shift register connected to the crankshaft position signal generating means and shifting the time of occurrence of said ignition control signal as determined by said ignition generating means by the time required for the crankshaft of the engine to rotate through an angle of revolution which will place a piston in the cylinder with which another spark plug is associated in the compression stroke position.

* * * * *